(12) United States Patent
Elsasser et al.

(10) Patent No.: US 8,519,984 B2
(45) Date of Patent: Aug. 27, 2013

(54) INPUT DEVICE AND DISPLAY SYSTEM HAVING THE SAME

(75) Inventors: Gary Elsasser, Coto de Caza, CA (US); Jeff Zolnowsky, Vermillion, SD (US); Michael Cochran, Aliso Viejo, CA (US); David Kim, Irvine, CA (US)

(73) Assignee: ACER Incorporated, Hsichih, Taipei Hsien (TW)

( * ) Notice: Subject to any disclaimer, the term of this patent is extended or adjusted under 35 U.S.C. 154(b) by 766 days.

(21) Appl. No.: 12/544,481

(22) Filed: Aug. 20, 2009

(65) Prior Publication Data
US 2011/0043492 A1    Feb. 24, 2011

(51) Int. Cl.
*G06F 3/033*    (2013.01)

(52) U.S. Cl.
USPC .......................................... 345/179

(58) Field of Classification Search
None
See application file for complete search history.

(56) References Cited

U.S. PATENT DOCUMENTS

| | | | | |
|---|---|---|---|---|
| 5,434,371 | A * | 7/1995 | Brooks | 178/19.04 |
| 5,502,568 | A * | 3/1996 | Ogawa et al. | 356/620 |
| 6,188,392 | B1 * | 2/2001 | O'Connor et al. | 345/179 |
| 6,441,362 | B1 * | 8/2002 | Ogawa | 250/221 |
| 6,577,299 | B1 * | 6/2003 | Schiller et al. | 345/179 |
| 6,933,933 | B2 * | 8/2005 | Fleming | 345/179 |
| 7,508,384 | B2 * | 3/2009 | Zhang et al. | 345/179 |
| 2003/0063045 | A1 * | 4/2003 | Fleming | 345/30 |
| 2004/0189621 | A1 | 9/2004 | Cho et al. | |
| 2005/0052435 | A1 | 3/2005 | Cho et al. | |
| 2005/0110778 | A1 * | 5/2005 | Ben Ayed | 345/179 |
| 2006/0170650 | A1 * | 8/2006 | Madrange | 345/156 |
| 2007/0040817 | A1 * | 2/2007 | Underwood et al. | 345/179 |
| 2008/0030486 | A1 * | 2/2008 | Cook | 345/179 |
| 2008/0136754 | A1 | 6/2008 | Tsuzaki et al. | |
| 2008/0143691 | A1 * | 6/2008 | Cook | 345/179 |
| 2008/0211786 | A1 | 9/2008 | Park et al. | |
| 2008/0259055 | A1 * | 10/2008 | Wilson | 345/179 |
| 2009/0115744 | A1 * | 5/2009 | Zhang et al. | 345/179 |
| 2011/0043492 | A1 * | 2/2011 | Elsasser et al. | 345/179 |

FOREIGN PATENT DOCUMENTS

| | | |
|---|---|---|
| CN | 1690939 A | 11/2005 |
| CN | 101727218 A | 6/2010 |
| TW | 293894 | 12/1996 |
| TW | 499657 | 12/2000 |
| TW | 591504 | 1/2002 |
| TW | 200828085 | 7/2008 |

OTHER PUBLICATIONS

Office Action mailed Jan. 6, 2013 in counterpart Chinese Application No. 201010219734.
Office Action mailed Feb. 5, 2013 in counterpart Taiwanese Application No. 098140913.

* cited by examiner

*Primary Examiner* — Peter Vincent Agustin
(74) *Attorney, Agent, or Firm* — Snell & Wilmer L.L.P.

(57) ABSTRACT

An input device capable of optically communicating with an electronic apparatus is provided. The input device includes a light source, a force sensor, and a controller. The force sensor is configured to sense a force applied to a tip of the input device and generate a first sensing signal corresponding to the sensed force. The controller is electrically connected to the light source and the force sensor, and configured to receive the first sensing signal and control the light source to generate light pulses in response to the first sensing signal according to a predefined protocol.

19 Claims, 4 Drawing Sheets

INPUT DEVICE AND DISPLAY SYSTEM HAVING THE SAME

FIELD OF INVENTION

The present invention relates to an input device, and more particularly, to an input device capable of optically communicating with an electronic apparatus.

BACKGROUND OF THE INVENTION

The touch panels have been utilized as inputs means for various electronic apparatuses. The touch panels can be classified into resistance type touch panel, capacitance type touch panel, ultrasonic type touch panel, and infrared type touch panel, etc., according to work principles. FIG. 1 shows a conventional infrared type touch panel for detecting a position of an object present in a particular region. The electronic apparatus 10 includes a display panel 20, multiple infrared receiving devices 30 and 32, and an infrared emitting device 40. The infrared receiving devices 30 and 32 and the infrared emitting device 40 are disposed on the perimeter of panel 20. When a finger or other object 60 is set in a certain position on the display panel 20, light emitted by the infrared emitting device 40 will be reflected by the object 60. Therefore, the infrared receiving devices 30 and 32 can sense light reflected by the object 60 from multiple angles. The infrared receiving devices 30 and 32 can translate the received light into electrical signals which are then transmitted to a processor 50. These electrical signals are correlated by the processor 50 to generate X and Y coordinates of the object 60. In short, the coordinates of the object 60 can be obtained by analyzing the light received by the infrared receiving devices 30 and 32. The processor 50 then sends these coordinates to an operating system to, for example, position a curser in the corresponding X and Y locations on the display panel 20.

However, although drawing directly on the display panel 20 with fingers or other objects 60 is possible, the finger or object 60 cannot communicate any other information to the operating system except for the X and Y coordinates. Therefore, many drawing attributes, such as line width, color, and rotation angle must be set though control buttons or other user interface, which requires users to interface with the electronic apparatus in an unnatural way. This limits the user's ability to interact with drawing programs in an artistic way and impedes the creative process.

Consequently, it is necessary to provide an input device capable of giving user the best control for communicating with the touch panel.

SUMMARY OF THE INVENTION

For obviating the problems due to limitations and disadvantages of the related arts, the present invention provides an optical input device that enables the user to control many attributes of the drawing expression during the painting process, such as line width, color intensity, color selection, brush type, rotation angle, and the like.

According to an aspect of the present invention, an input device is provided. The input device includes a light source, a force sensor, and a controller. The force sensor is configured to sense a force applied to a tip of the input device and generate a first sensing signal corresponding to the sensed force. The controller is electrically connected to the light source and the force sensor, and configured to receive the first sensing signal and control the light source to generate light pulses in response to the first sensing signal according to a predefined protocol.

According to another aspect of the present invention, an input device for optically communicating with an electronic apparatus according to a predefined protocol is provided. The electronic apparatus has a drawing application installed therein. The input device includes a light source, a force sensor, and a controller. The force sensor is configured to sense a force applied to a tip of the input device and generate a first sensing signal corresponding to the sensed force. The controller is electrically connected to the light source and the force sensor, and configured to receive the first sensing signal and control the light source to generate light pulses in response to the first sensing signal according to the predefined protocol. The light pulses are received by the electronic apparatus and translated into a command sequence for setting drawing attributes of the drawing application.

According to still another aspect of the present invention, a display system is provided. The display system includes an input device and an electronic apparatus. The input device includes a light source, a force sensor, and a controller. The force sensor is configured to sense a force applied to a tip of the input device and generate a first sensing signal corresponding to the sensed force. The controller is electrically connected to the light source and the force sensor, and configured to receive the first sensing signal and control the light source to generate light pulses in response to the first sensing signal according to a predefined protocol. The electronic apparatus has a drawing application installed therein, and includes a display unit, a photo sensor for receiving the light pulses, and a processor. The processor is electrically connected to the display unit and the photo sensor, and configured to generate coordinates of the input device and a command sequence associated with the drawing application in response to the light pulses.

The other aspects of the present invention, part of which will be described in the following description, part of which will be apparent from description, or can be known from the execution of the present invention are presented below. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying figures, wherein.

DETAILED DESCRIPTION

The present invention relates to an optical input device to enable users to naturally interface with an optical touch panel, without the need to separately interface with a drawing application to communicate drawing attributes in addition to coordinate information. To make the disclosure of the present invention more detailed and complete, references are made to the following description in conjunction with FIGS. 2-4. However, the devices, elements, and operations in the following embodiments are provided for exemplary purposes only.

Figure 1:
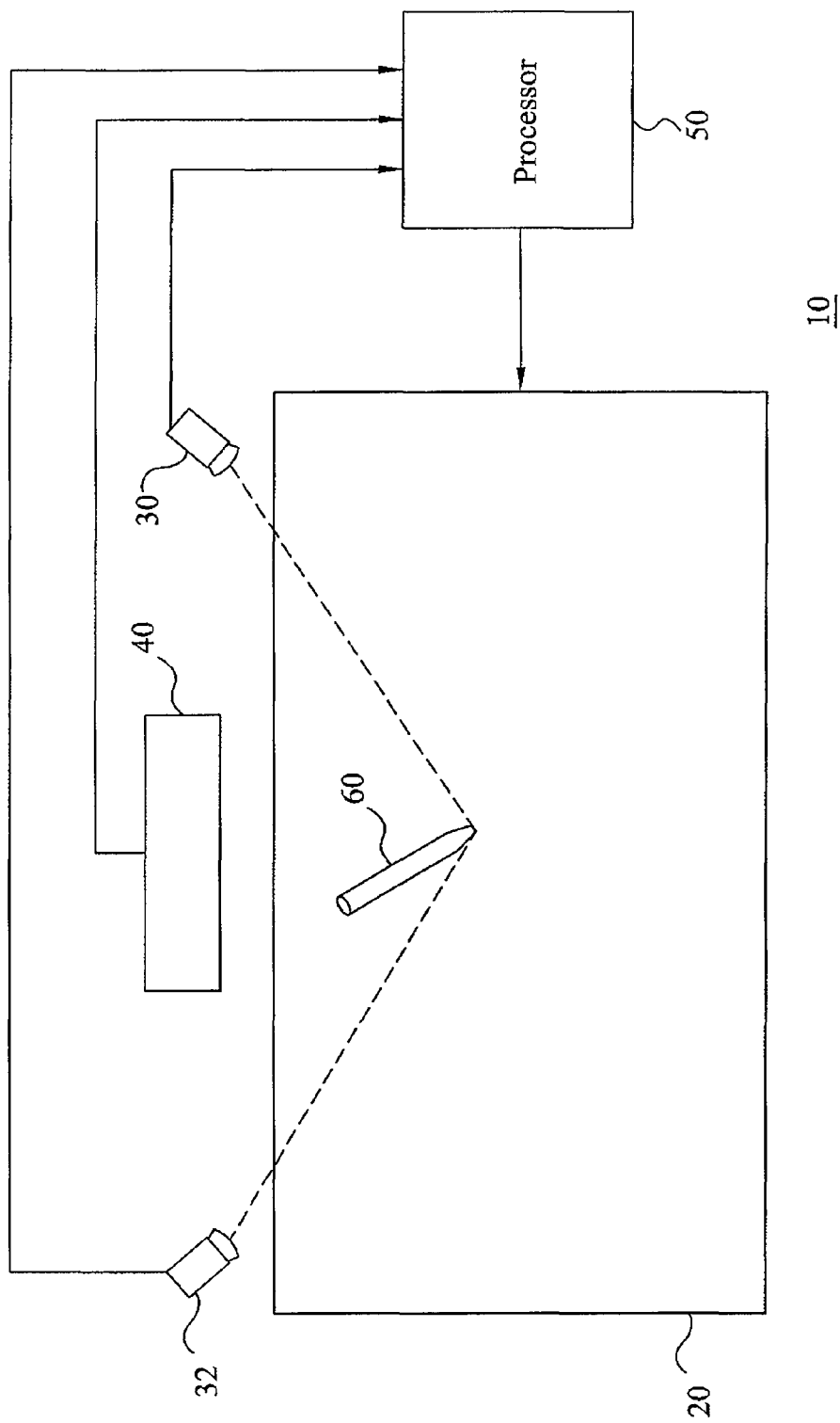
FIG. 1 shows a conventional infrared type touch panel for detecting a position of an object.
Figure 2:
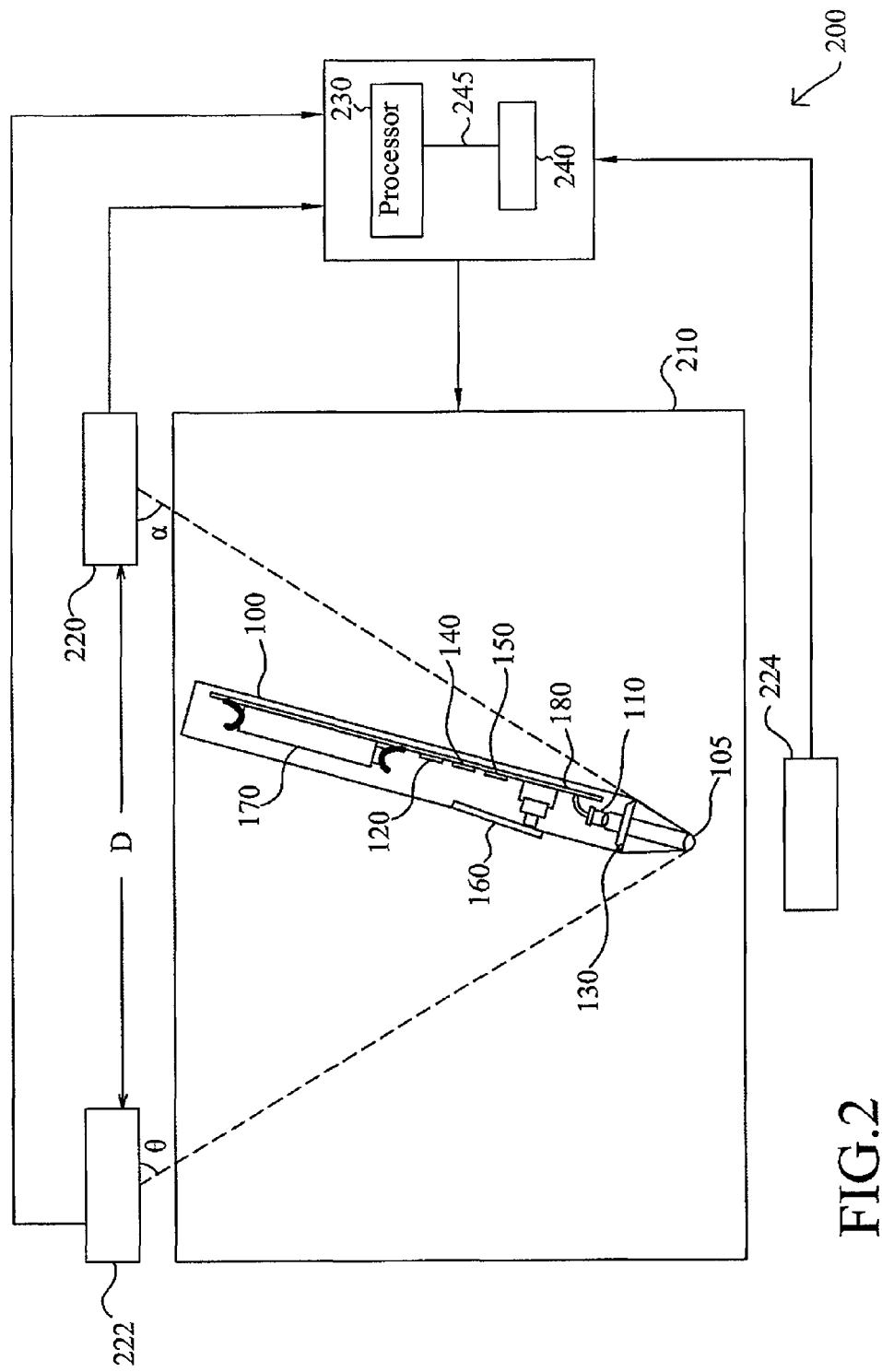
FIG. 2 is a schematic block diagram showing an overall arrangement of a display system according to one embodiment of the present invention.

FIG. 2 is a schematic block diagram showing an overall arrangement of a display system according to one embodiment of the present invention, including an input device 100 and an electronic apparatus 200. Referring to FIG. 2, the input device 100 has a pen-shape body with an opening 105 at its tip. The input device 100 includes a light source 110, a controller 120, and a force sensor 130, which can be all arranged on a printed circuit board 180 or the like. The electronic apparatus 200 includes a display unit 210, photo sensors 220 and 222, and a processor 230 electrically connecting to the display unit 210 and the photo sensors 220 and 222. In this embodiment, the electronic apparatus 200 has a drawing application 240 installed therein to allow users to create graphics on the display unit 210, which can be Microsoft paint, Adobe photoshop, or any other similar programs.

The light source 110 of the input device 100 is preferably, but not limited to, a light-emitting diode. The light generated by the light source 110 is emitted through the opening 105. The force sensor 130 is configured to sense force applied to tip of the input device 100 when the input device 100 is in contact with the display unit 210. The force sensor 130 is disposed preferably, but not necessarily, as close as possible to the opening 105, and can be implemented as, for example, a strain gauge or a force-sensing resistor which are well-known by a person skilled in the art and so the details thereof are omitted hereinafter. The force sensor 130 can operate to communicate a first sensing signal to the controller 120 in response to the degree of sensed force, and then the controller 120 can control the pattern of light outputted from the light source 110 according to the first sensing signal from the force sensor 130. As a result, the force applied to the tip of the input device 100 can be translated into the variation of characteristics of the light outputted from the light source 110. For example, after receiving the first sensing signal, the controller 120 controls the light source 110 to generate light pulses in response to the first sensing signal. The pulse width, frequency, or amplitude of the light pulses may vary with the first sensing signal according to a predefined protocol which will be described in further detail hereinbelow.

Also referring to FIG. 2, the electronic apparatus 200 can be implemented as a conventional personal computer, a work station, a notebook, a palm top PC, a network computer, or a combination thereof. The display unit 210 is configured to display an image, and can be a plasma display panel (PDF), a liquid crystal display (LCD), or any device which can display information. The photo sensors 220 and 222 are configured to receive the light signals outputted from the light source 110 of the input device 100 and convert the received light signals into electrical signals, which can be located at any suitable place, such as at corners or along the periphery of display unit 210. The electrical signals outputted from the photo sensors 220 and 222 are then received by the processor 230.

Generally, the light signals received by the photo sensors 220 and 222 are modulated light pulses carrying both coordinate information and drawing attribute information. The coordinate information may include, for example, light incident angles α, θ of the photo sensors 220 and 222 respectively and a distance D between the two photo sensors 220 and 222. The processor 230 can determine two-dimensional coordinates of the input device 100 based on the coordinate information, and this coordinate determining process is well-known by a person skilled in the art and therefore the detailed description thereof will be omitted. Furthermore, the drawing attribute information indicated by the predefined protocol can be converted into a command sequence by the processor 230. The command sequence and the two-dimensional coordinates are then communicated to the drawing application 240 through a defined programming interface 245. Then, an image corresponding to the command sequence is displayed at a position corresponding to the two-dimensional coordinates on the display unit 210 through the drawing application 240.

In sum, the controller 120 of the input device 100 senses changes in the force sensor 130 and communicates drawing attributes information to the electronic apparatus 200 by controlling and modulating physical characteristics of light outputted from the light source 110. In other words, the light from the light source 110 is continuously variable based on the pressure the user applies to the input device 100 while drawing. Variations in the light are sensed by the photo sensors 220 and 222 located around the display unit 210. The processor 230 of the electronic apparatus 200 will sense the characteristics of light and translate these into a pressure level for use in varying the width of the lines (or point size, color intensity or other attributes) generated on the display unit 210.

Each of the photo sensors 220 and 222 of the present invention can be, but not limited to, a CCD camera or a CMOS camera, and the present invention does not intend to limit the number of the photo sensors adopted in the electronic apparatus 200. For example, to help in processing the digital modulation and communication protocol, the photo sensors 220 and 222 can be used specifically for two-dimensional coordinates, and an additional photo sensor 224 can be added as a dedicated photo sensor for attribute communication, whereby the optical communication can be speeded up.

Referring to FIG. 2 again, for communication more drawing attributes, such as color selection, brush type, etc., between the input device 100 and the electronic apparatus 200, the input device 100 can further include an accelerometer 140, a gyroscope 150, and a plurality of touch buttons 160, which supply additional parameters for the input device 100 to communicate to the electronic apparatus 200. The information from accelerometer 140, the gyroscope 150, and the touch buttons 160 are all collected by the controller 120, and then light outputted from the light source 110 can be correspondingly digitally modulated under the control of the controller 120. The input device 100 further includes a power source 170 mounted on the printed circuit board 180 for providing electrical power to various above-mentioned components which can be electrically coupled as necessary using, for example, a bus (not shown).

The accelerometer 140 and the gyroscope 150 can be any motion sensors known or used in the art capable of detecting the radial and angular motion of the input device 100. The accelerometer 140 can detect various motions of the input device 100, and generate a second sensing signal corresponding to the sensed motion to the controller 120. For example, if the accelerometer 140 detects that the input device 100 has stayed motionless for more than a threshold period of time, it can instruct the controller 120 to transit from a full power mode to a power saving mode. Once the accelerometer 140 detects the movement of the input device 100, the controller 120 is switched from the power saving mode to the full power mode. The toggle between the full power mode and the power saving mode can be realized by a timing control circuitry (not shown) as known by those skilled in the art. In one embodiment, the user can also quickly reset all the drawing attributes (such as color, brush type, etc.) of the input device 100 to a user defined default state with multiple snap actions.

The gyroscope 150 can be used to detect inclined angle and rotation of the input device 100 and generate a third sensing signal corresponding to the sensed result to the controller 120. In one embodiment, the detected inclined angle can be used in conjunction with a flat brush selection of the drawing application 240, which may, for example, create flat brush strokes or simulate calligraphic writing on the display unit 210. Furthermore, the information representing the detected rotation can be passed on to the drawing application 240 to spin the brush around to make wide strokes. It should be noted that the communication of the above commands to control the drawing attributes can be delayed until the input device 100 is in contact with the electronic apparatus 200 and able to send an optical signal to the photo sensors 220 and 222.

The touch buttons 160 can enable the user to control various drawing attributes while the user is drawing. The touch buttons 160, typically three, are located on one side of the input device 100, which are preferably disposed just under the user's fingers, to enable the user to communicate requested changes of the drawing attributes to the electronic device 200. The user can input a plurality of fourth sensing signals to the controller 120 through the touch buttons 160. The touch buttons 160 can be assigned to any desired drawing attributes, such as a brush selection or a color mixture of red, green or blue, or perhaps yellow, magenta and cyan. In one embodiment, the user can select which button will control which attribute. For example, a driver or a software application for the input device 100, installed on the electronic device 200, can be used to assist the user in setting up the button assignment. This driver or software application can translate the predefined protocol to the assigned attributes and then call the appropriate command in the drawing application 240.

Figure 3:
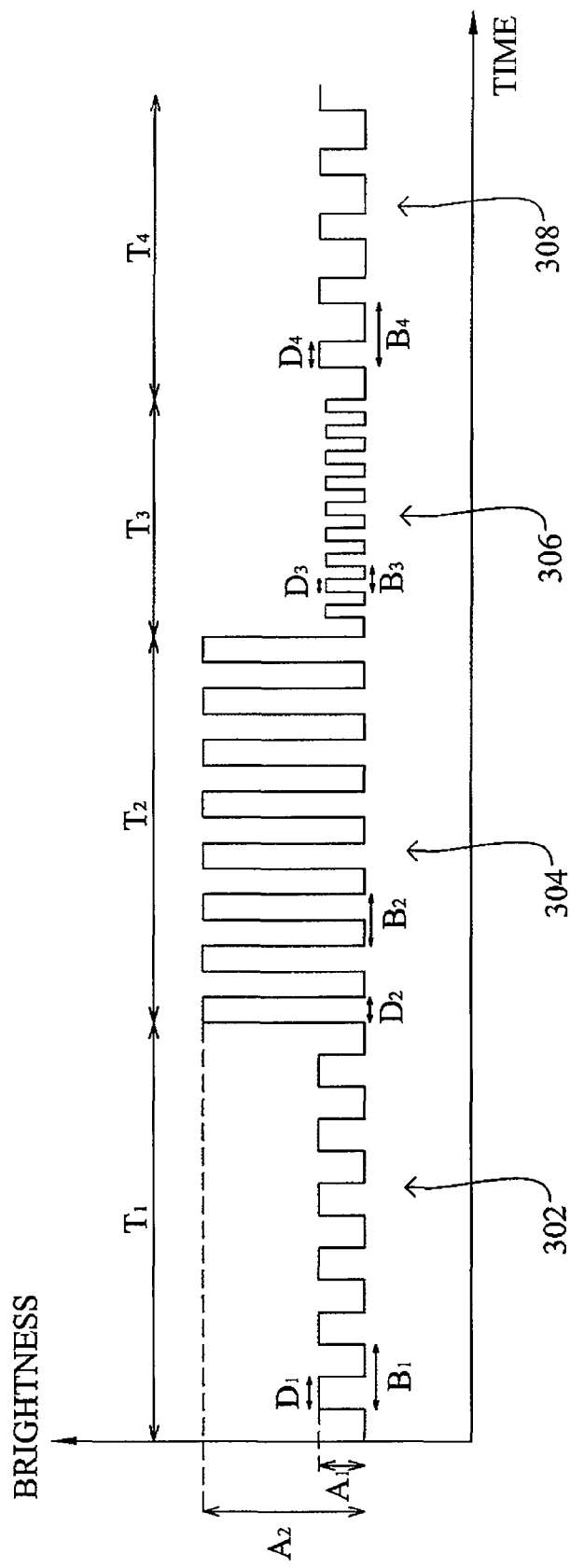
FIG. 3 is a graph showing an example waveform of a modulated light signal outputted from the light source according to one embodiment of the present invention.

FIG. 3 is a graph showing an example waveform of a modulated light signal outputted from the light source 110 according to one embodiment of the present invention. Generally, the controller 120 can control the on/off state of the light source 110 by generating burst drive signals based on a predefined protocol, and can also control the intensity of light by varying current or voltage through the light source 110, such that various light pulses can be generated. In the embodiment shown in FIG. 3, first light pulses 302, second light pulses 304, third light pulses 306, and fourth light pulses 308 represent different drawing attribute information, and their time periods T1-T4, pulse widths D1-D4, cycle periods B1-B4, and amplitudes A1-A2 can be varied with the all kinds of sensing signals described above according to the predefined protocol. In other words, one or more physical characteristics of the light pulses can be changed in a manner as to encode information in the signal.

Figure 4:
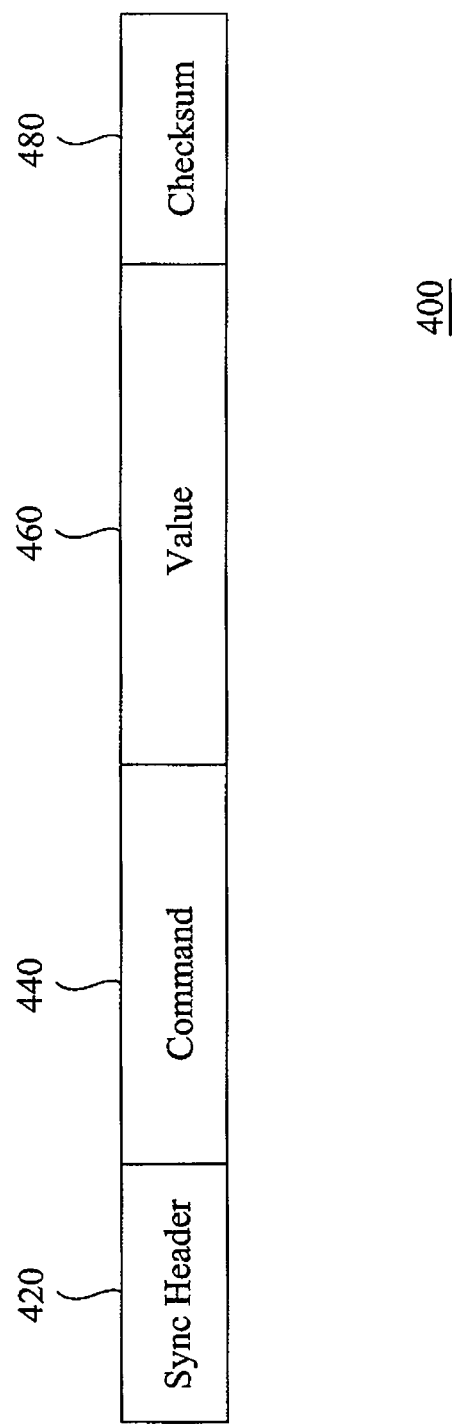
FIG. 4 illustrates an example protocol used between the input device and the electronic apparatus.

As described above, a predefined protocol can be established to define the transmission of information from the input device 100 to the electronic apparatus 200. FIG. 4 illustrates an example protocol 400 defining the relationship between the light signals and the drawings attributes, which can be used to send drawing commands from the input device 100 to the electronic apparatus 200 through this optical communicating manner. In this embodiment, the protocol 400 contains a synchronization header 420, a command portion 440, a value portion 460, and a checksum 480. The use of fixed length protocol is an example of a way to simplify the digital modulation used for communicating a drawing command, but the protocol with dynamic length can also be used. The synchronization header 420 typically has sufficient length to enable the electronic apparatus 200 to discover a drawing command will be sent and establish a timing clock to sample the digital light modulation. Next, the command portion 440 of the protocol 400 is sent following the synchronization header 420. The length of the command portion 440 is predetermined based on the number of possible drawing attributes that will be sent. Next, the value portion 460 is sent, which is associated with the command portion 440. The length of the value 460 is predetermined based on the maximum number of possibilities for all drawing attributes. Finally, a checksum 480 is sent to ensure data integrity of the communication.

The protocol can be decoded by the processor 230, such that the digital modulation of light can be translated in to a command sequence for setting drawing attributes of the drawing application 240. The command sequence along with the two-dimensional coordinates of the input device 100 are then communicated to the drawing application 240 through a defined application programming interface 245.

The components and the arrangement thereof discussed above for the input device 100 and the electronic device 200 are by way of example only, and other components can be incorporated into the input device 100 and/or the electronic device 200, such as any memory devices for storing data and/or software for controlling the device or processing data. In another embodiment, the input device 100 can have two light sources at two opposite ends thereof, one emitting light having a first wavelength for drawing function and the other emitting light having a second wavelength for erasing function.

By introducing an input device with a light source, the electronic apparatus can differentiate this input device from a finger or passive pointing device. Existing optical touch panel devices have difficulties in operation while the user places his palm on the display panel. The optical input device of the present invention solves this problem. Since the optical input device emits light, the photo sensor can only look for light emitting from the input device, ignoring any other touch detections (such as palm pressing against the display panel). Furthermore, the optical input device of the present invention can communicate with the electronic apparatus only by way of light, i.e. the light generated by the optical input device is used to communicate with the electronic apparatus without the need of any additional components or connections for communication. This can significantly reduce the cost of the optical input device.

While this invention has been described with reference to the illustrative embodiments, these descriptions should not be construed in a limiting sense. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

The invention claimed is:
1. An input device, comprising:
a light source;
a force sensor for sensing a force applied to a tip of the input device and generating a first sensing signal corresponding to the sensed force;
an accelerometer for measuring an acceleration of the input device and generating a second sensing signal corresponding to the sensed acceleration; and
a controller electrically connected to the light source, the force sensor and the accelerometer, the controller receiving the first and the second sensing signal and controlling the light source to vary pulse width, frequency, or amplitude of light pulses of the light source in response to the first and the second sensing signal according to a predefined protocol.

2. The input device according to claim 1, wherein the controller controls the light source to generate the light pulses by turning the light source on and off alternatively.

3. The input device according to claim 2, wherein the controller further controls the pulse width, the frequency, or the amplitudes of the light pulses by varying current or voltage through the light source.

4. The input device according to claim 1, wherein the force sensor is a strain gauge or a force-sensing resistor.

5. The input device according to claim 1, further comprising a gyroscope for measuring an angular velocity of the input device and generating a third sensing signal associated therewith to the controller, wherein the controller controls operation of the light source in response to the third sensing signal according to the predefined protocol.

6. The input device according to claim 1, further comprising a plurality of buttons for a user to input a plurality of fourth sensing signals to the controller, wherein the controller controls operation of the light source in response to the input sensing signal according to the predefined protocol.

7. The input device according to claim 1, wherein the light source emits light having a first wavelength, and wherein the input device further comprises an additional light source for emitting light having a second wavelength different from the first wavelength.

8. An input device for optically communicating with an electronic apparatus according to a predefined protocol, the electronic apparatus having a drawing application installed therein, the input device comprising:
   a light source;
   a force sensor for sensing a force applied to a tip of the input device and generating a first sensing signal corresponding to the sensed force;
   an accelerometer for measuring an acceleration of the input device and generating a second sensing signal corresponding to the sensed acceleration; and
   a controller electrically connected to the light source, the force sensor and the accelerometer, the controller receiving the first and the second sensing signal and controlling the light source to vary pulse width, frequency, or amplitude of light pulses in response to the first and the second sensing signal according to the predefined protocol;
   wherein the light pulses are received by the electronic apparatus and translated into a command sequence for setting drawing attributes of the drawing application.

9. The input device according to claim 8, wherein the controller controls the light source to generate the light pulses by turning the light source on and off alternatively.

10. The input device according to claim 8, wherein the controller further controls the pulse width, the frequency, or the amplitudes of the light pulses by varying current or voltage through the light source.

11. The input device according to claim 8, further comprising a gyroscope, and a plurality of buttons for providing one or more sensing signals to the controller, wherein the controller controls operation of the light source in response to the sensing signals according to the predefined protocol.

12. The input device according to claim 8, wherein the predefined protocol defines a relation between the drawing attributes and physical characteristics of the light pulses.

13. A display system, comprising:
   an input device, comprising:
      a light source;
      a force sensor for sensing a force applied to a tip of the input device and generating a first sensing signal corresponding to the sensed force;
      an accelerometer for measuring an acceleration of the input device and generating a second sensing signal corresponding to the sensed acceleration; and
      a controller electrically connected to the light source, the force sensor and the accelerometer, the controller receiving the first and the second sensing signal and controlling the light source to vary pulse width, frequency, or amplitude of light pulses of the light source in response to the first and the second sensing signal according to a predefined protocol; and
   an electronic apparatus having a drawing application installed therein, comprising:
      a display unit;
      a photo sensor for receiving the light pulses; and
      a processor electrically connected to the display unit and the photo sensor, the processor generating coordinates of the input device and a command sequence associated with the drawing application in response to the light pulses.

14. The display system according to claim 13, wherein the drawing application generates display information to be displayed on the display unit according to the command sequence and the coordinates.

15. The display system according to claim 13, wherein the photo sensor translates the received light pulses into electrical signals, and the electrical signals are received by the processor and translated into the command sequence according to the predefined protocol.

16. The display system according to claim 13, wherein the command sequence is for setting drawing attributes of the drawing application, and the drawing attributes comprises line width, color selection, color intensity, point size, brush type, rotation angle, and combination thereof.

17. The display system according to claim 16, wherein the predefined protocol defines a relation between the drawing attributes and physical characteristics of the light pulses.

18. The display system according to claim 13, wherein the input device further comprises a gyroscope, and a plurality of buttons for providing one or more sensing signals to the controller, wherein the controller controls operation of the light source in response to the sensing signals according to the predefined protocol.

19. The display system according to claim 13, wherein the controller controls the light source to generate the light pulses by turning the light source on and off alternatively and by varying current or voltage through the light source.

\* \* \* \* \*